United States Patent
Szekely

(10) Patent No.: US 8,518,313 B2
(45) Date of Patent: Aug. 27, 2013

(54) PROCESS FOR ENHANCING COMPRESSION SET RESISTANCE OF FOAMED COPOLYESTER COMPOSITIONS

(75) Inventor: Peter Laszlo Szekely, Pringy (FR)

(73) Assignee: E I du Pont de Nemours and Company, Wilmington, DE (US)

( * ) Notice: Subject to any disclaimer, the term of this patent is extended or adjusted under 35 U.S.C. 154(b) by 340 days.

(21) Appl. No.: 13/093,180

(22) Filed: Apr. 25, 2011

(65) Prior Publication Data

US 2012/0098158 A1    Apr. 26, 2012

Related U.S. Application Data

(60) Provisional application No. 61/346,972, filed on May 21, 2010.

(51) Int. Cl.
*B29C 71/02* (2006.01)
(52) U.S. Cl.
USPC ............... 264/235; 264/321; 264/346
(58) Field of Classification Search
USPC .......................... 264/235, 321, 346
See application file for complete search history.

(56) References Cited

U.S. PATENT DOCUMENTS

| | | | |
|---|---|---|---|
| 3,766,146 A * | 10/1973 | Witsiepe | 528/301 |
| 4,198,037 A | 4/1980 | Anderson | |
| 4,629,761 A | 12/1986 | Wolfe et al. | |
| 5,541,258 A | 7/1996 | Aonuma et al. | |
| 6,179,008 B1 | 1/2001 | Kawazura et al. | |
| 2005/0101742 A1 | 5/2005 | Cohen et al. | |
| 2006/0267261 A1 | 11/2006 | Koenen et al. | |
| 2006/0270780 A1 | 11/2006 | Xu et al. | |

FOREIGN PATENT DOCUMENTS

EP    0846712 B1    5/2000

OTHER PUBLICATIONS

International Serch Report, Korean Intellectual Property Office Daejeon, ROK, in PCT/US2011/036903, PCT Counterpart of the Present U.S. Appl. No. 13/093,180.

* cited by examiner

*Primary Examiner* — James Sanders

(57) ABSTRACT

Disclosed herein is a process for heat treating a foamed copolyester thermoplastic sheet structure in order to achieve a sheet structure having a compression set resistance (as determined according to ISO 1856, 22 hours, 70° C., 30% compression) of less than 11%. Heat treating involves annealing followed by at least two cycles of pre-compression at approximately the annealing temperature.

10 Claims, No Drawings

PROCESS FOR ENHANCING COMPRESSION SET RESISTANCE OF FOAMED COPOLYESTER COMPOSITIONS

CROSS-REFERENCE TO RELATED APPLICATIONS

This application claims the benefit of U.S. Provisional Application No. 61/346,972 filed May 21, 2010.

FIELD OF THE INVENTION

The present invention relates to the field of foamed copolyester thermoplastic elastomer compositions that have a compression set resistance (ISO 1856, 22 hours, 70° C., 30% compression) of less than

BACKGROUND OF THE INVENTION

Manufacture of foamed copolyester thermoplastic elastomer sheet structures involves the addition of a foaming agent to thermoplastic copolyesters during melt-extrusion processes. The foaming agent may be a conventional chemical foaming agent, gas-encapsulating thermoplastic microspheres (e.g. Expancel® microspheres available from Eka Chemicals), or a combination thereof. The melt-extruded foam sheet structures find utility, among others, as vibration absorbing materials. Compression set resistance (ISO 1856, 22 hours, 70° C., 30% compression) of such sheet structures is typically 15-25%.

There remains a need for foamed copolyester sheet structures that have an enhanced compression set resistance (ISO 1856, 22 hours, 70° C., 30% compression) of less than 11%.

SUMMARY OF THE INVENTION

Described herein is a process for improving (i.e. lowering) the compression set resistance of foamed copolyester sheet structures. Accordingly, an aspect of the present invention is a process for enhancing the compression set resistance of a foamed copolyester thermoplastic elastomer sheet structure comprising:
A) providing a foamed copolyester thermoplastic sheet structure comprising gas-encapsulating thermoplastic microspheres;
B) annealing said foamed copolyester thermoplastic sheet structure at a temperature of at least 70° C. for a period of 10 to 60 minutes to form an annealed foamed copolyester thermoplastic sheet structure having an uncompressed thickness;
C) compressing, at a temperature of at least 70° C., said annealed foamed copolyester thermoplastic sheet structure to a thickness of 20 to 50% of the uncompressed thickness of said sheet structure,
D) releasing said compression;
E) repeating steps C) and D) at least once; and
F) cooling said sheet structure to less than 30° C. to form a foamed copolyester sheet structure having a compression set resistance, as determined according to ISO 1856, 22 hours, 70° C., 30% compression of less than 11%.

Another aspect of the present invention is a process for enhancing the compression set resistance of a foamed copolyester thermoplastic elastomer sheet structure comprising:
A) extruding through a die a foamed copolyester thermoplastic sheet structure comprising gas-encapsulating thermoplastic microspheres;
B) maintaining said foamed copolyester thermoplastic sheet structure exiting said the at a temperature of at least 70° C. for a period of 3 to 120 seconds to form an annealed foamed copolyester thermoplastic sheet structure having an uncompressed thickness;
C) compressing, at a temperature of at least 70° C., said annealed foamed copolyester thermoplastic sheet structure to a thickness of 20 to 50% of the uncompressed thickness of said sheet structure;
D) releasing said compression;
E) repeating steps C) and D) at least once; and
F) cooling said sheet structure to less than 30° C. to form a foamed copolyester sheet structure having a compression set resistance, as determined according to ISO 1856, 22 hours, 70° C., 30% compression of less than 11%.

DETAILED DESCRIPTION OF THE INVENTION

Copolyester thermoplastic elastomers (TPCs) include copolyesterester elastomers, copolycarbonateester elastomers, and copolyetherester elastomers, the latter being preferred.

Copolyesterester elastomers are block copolymers containing a) hard polyester segments and b) soft and flexible polyester segments. Examples of hard polyester segments are polyalkylene terephthalates and poly(cyclohexanedicarboxylic acid cyclohexanemethanol). Examples of soft polyester segments are aliphatic polyesters, including polybutylene adipate, polytetramethyladipate and polycaprolactone. The copolyesterester elastomers contain blocks of ester units of a high melting polyester and blocks of ester units of a low melting polyester which are linked together through ester groups and/or urethane groups. Copolyesterester elastomers comprising urethane groups may be prepared by reacting the different polyesters in the molten phase, after which the resulting copolyesterester is reacted with a low molecular weight polyisocyanate such as for example diphenylmethylene diisocyanate.

Copolycarbonateester elastomers are block copolymers containing a) hard segments consisting of blocks of an aromatic or semi-aromatic polyester and b) soft segments consisting of blocks of a polycarbonate containing polymeric component. Suitably, the copolycarbonateester elastomer is made of hard polyester segments made up of repeating units derived from an aromatic dicarboxylic acid and an aliphatic diol, and of soft segments made up of repeating units of an aliphatic carbonate, and/or soft segments made up of randomly distributed repeating units of an aliphatic carbonate and either an aliphatic dial and an aliphatic dicarboxylic acid or lactone, or a combination of these, wherein the hard segments and the soft segments can be connected with a urethane group. These elastomers and their preparation are described in, e.g. EP Pat. No. 0846712.

Copolyetherester elastomers are the preferred thermoplastic polyester elastomers employed in this invention and have a multiplicity of recurring long-chain ester units and short-chain ester units joined head-to-tail through ester linkages, said long-chain ester units being represented by formula (A):

(A)

and said short-chain ester units being represented by formula (B):

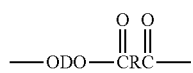 (B)

wherein
G is a divalent radical remaining after the removal of terminal hydroxyl groups from poly(alkylene oxide)glycols having a number average molecular weight of between about 400 and about 6000, or preferably between about 400 and about 3000;
R is a divalent radical remaining after removal of carboxyl groups from a dicarboxylic acid having a molecular weight of less than about 300;
D is a divalent radical remaining after removal of hydroxyl groups from a diol having a molecular weight less than about 250.

As used herein, the term "long-chain ester units" as applied to units in a polymer chain refers to the reaction product of a long-chain glycol with a dicarboxylic acid. Suitable long-chain glycols are poly(alkylene oxide) glycols having terminal (or as nearly terminal as possible) hydroxy groups and having a number average molecular weight of from about 400 to about 6000, and preferably from about 600 to about 3000. Preferred poly(alkylene oxide)glycols include poly(tetramethylene oxide)glycol, poly(trimethylene oxide)glycol, poly (propylene oxide)glycol, poly(ethylene oxide)glycol, copolymer glycols of these alkylene oxides, and block copolymers such as ethylene oxide-capped poly(propylene oxide)glycol. Mixtures of two or more of these glycols can be used.

As used herein, the term "short-chain ester units" as applied to units in a polymer chain of the copolyetheresters refers to low molecular weight compounds or polymer chain units having molecular weights less than about 550.

They are made by reacting a low molecular weight diol or a mixture of dials (molecular weight below about 250) with a dicarboxylic acid to form ester units represented by Formula (B) above. Included among the low molecular weight diols which react to form short-chain ester units suitable for use for preparing copolyetheresters are acyclic, alicyclic and aromatic dihydroxy compounds. Preferred compounds are dials with about 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2-8 carbon atoms, and a more preferred diol is 1,4-butanediol. Included among the bisphenols which can be used are bis(p-hydroxy)diphenyl, bis(p-hydroxyphenyl)methane, and bis(p-hydroxyphenyl)propane. Equivalent ester-forming derivatives of diols are also useful.

As used herein, the term "diols" includes equivalent ester-forming derivatives such as those mentioned. However, any molecular weight requirements refer to the corresponding diols, not their derivatives.

Dicarboxylic acids that can react with the foregoing long-chain glycols and low molecular weight diols to produce the copolyetheresters are aliphatic, cycloaliphatic or aromatic dicarboxylic acids of a low molecular weight. i.e., having a molecular weight of less than about 300. The term "dicarboxylic acids" as used herein includes functional equivalents of dicarboxylic acids that have two carboxyl functional groups that perform substantially like dicarboxylic acids in reaction with glycols and diols in forming copolyetherester polymers. These equivalents include esters and ester-forming derivatives such as acid halides and anhydrides. The molecular weight requirement pertains to the acid and not to its equivalent ester or ester-forming derivative.

Thus, an ester of a dicarboxylic acid having a molecular weight greater than 300 or a functional equivalent of a dicarboxylic acid having a molecular weight greater than 300 are included provided the corresponding acid has a molecular weight below about 300. The dicarboxylic acids can contain any substituent groups or combinations that do not substantially interfere with the copolyetherester polymer formation.

As used herein, the term "aliphatic dicarboxylic acids" refers to carboxylic acids having two carboxyl groups each attached to a saturated carbon atom, lithe carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

As used herein, the term "aromatic dicarboxylic acids" refer to dicarboxylic acids having two carboxyl groups each attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —SO$_2$—. Representative useful aliphatic and cycloaliphatic acids that can be used include sebacic acid; 1,3-cyclohexane dicarboxylic acid; 1,4-cyclohexane dicarboxylic acid; adipic acid; glutaric acid; 4-cyclohexane-1,2-dicarboxylic acid; 2-ethylsuberic acid; cyclopentanedicarboxylic acid decahydro-1,5-naphthylene dicarboxylic acid; 4,4'-bicyclohexyl dicarboxylic acid; decahydro-2,6-naphthylene dicarboxylic acid: 4,4'-methylenebis(cyclohexyl) carboxylic acid; and 3,4-furan dicarboxylic acid. Preferred acids are cyclohexane-dicarboxylic acids and adipic acid.

Representative aromatic dicarboxylic acids include phthalic, terephthalic and isophthalic acids; bibenzoic acid; substituted dicarboxy compounds with two benzene nuclei such as bis(p-carboxyphenyl)methane; p-oxy-1,5-naphthalene dicarboxylic acid; 2,6-naphthalene dicarboxylic acid; 2,7-naphthalene dicarboxylic acid; 4,4'-sulfonyl dibenzoic acid and $C_1$-$C_{12}$ alkyl and ring substitution derivatives thereof, such as halo, alkoxy, and aryl derivatives. Hydroxyl acids such as p-(beta-hydroxyethoxy)benzoic acid can also be used provided an aromatic dicarboxylic acid is also used.

Aromatic dicarboxylic acids are a preferred class for preparing the copolyetherester elastomer useful for this invention. Among the aromatic acids, those with 8-16 carbon atoms are preferred, particularly terephthalic acid alone or with a mixture of phthalic and/or isophthalic acids.

The copolyetherester elastomer preferably comprises from 15 to 99 weight percent short-chain ester units corresponding to Formula (B) above, the remainder being long-chain ester units corresponding to Formula (A) above. More preferably, the copolyetherester elastomer comprises from 20 to 95 weight percent, and even more preferably from 20 to 50 weight percent short-chain ester units, where the remainder is long-chain ester units. More preferably, at least about 70% of the groups represented by R in Formulae (A) and (B) above are 1,4-phenylene radicals and at least about 70% of the groups represented by D in Formula (B) above are 1,4-butylene radicals and the sum of the percentages of R groups which are not 1,4-phenylene radicals and D groups that are not 1,4-butylene radicals does not exceed 30%. If a second dicarboxylic acid is used to make the copolyetherester, isophthalic acid is preferred and if a second low molecular weight dial is used, ethylene glycol, 1,3-propanediol, cyclohexanedimethanol, or hexamethylene glycol are preferred.

A blend or mixture of two or more copolyetherester elastomers can be employed in the sheet structures of this invention. The copolyetherester elastomers used in the mixture need not on an individual basis come within the values disclosed herein for the elastomers. However, the blend of two or more copolyetherester elastomers must conform to the values described herein for the copolyetheresters on a weighted average basis. For example, in a mixture that contains equal amounts of two copolyetherester elastomers, one copolyetherester elastomer can contain 60 weight percent short-chain ester units and the other resin can contain 30 weight percent short-chain ester units for a weighted average of 45 weight percent short-chain ester units.

Preferred copolyetherester elastomers include, but are not limited to, copolyetherester elastomers prepared from monomers comprising (1) poly(tetramethylene oxide)glycol; (2) a dicarboxylic acid selected from isophthalic acid, terephthalic acid and mixtures of these; and (3) a dial selected from 1,4-butanediol, 1,3-propanediol and mixtures of these, or from monomers comprising (1) poly(trimethylene oxide)glycol; (2) a dicarboxylic acid selected from isophthalic acid, terephthalic acid and mixtures of these; and (3) a diol selected from 1,4-butanediol, 1,3-propanediol and mixtures of these, or from monomers comprising (1) ethylene oxide-capped poly(propylene oxide)glycol; (2) a dicarboxylic acid selected from isophthalic acid, terephthalic acid and mixtures of these; and (3) a diol selected from 1,4-butanediol, 1,3-propanediol and mixtures of these.

Preferably, the copolyetherester elastomers described herein are made from esters or mixtures of esters of terephthalic acid and/or isophthalic acid, 1,4-butanediol and poly(tetramethylene ether)glycol or poly(trimethylene ether)glycol or ethylene oxide-capped polypropylene oxide glycol, or are prepared from esters of terephthalic acid, e.g. dimethylterephthalate, 1,4-butanediol and poly(ethylene oxide)glycol. More preferably, the copolyetheresters are prepared from esters of terephthalic acid, e.g. dimethylterephthalate, 1,4-butanediol and poly(tetramethylene ether)glycol.

Examples of suitable copolyetherester elastomers are commercially available under the trademark HYTREL® from E. I. du Pont de Nemours and Company, Wilmington, Del.

Gas-encapsulating thermoplastic microspheres are employed as the foaming agent to manufacture the sheet structures of this invention. The thermoplastic microspheres are made of an acrylic copolymer and contain blowing agent such as isooctane and isobutane. When exposed to temperatures between 80° and 220° C. (preferably between 140° and 195° C.), the acrylic copolymer shell stretches as the contained gas expands. Typical expansions are from about 10 μm to 40 μm. Suitable microspheres are available as EXPANCEL® from Eka Chemicals, a division of Akzo Nobel. Optionally a chemical foaming agent may be used in addition to the microspheres.

Generally, the foamed copolyester thermoplastic sheet structures of the invention contain between 1 and 5 (preferably 2-3) weight percent thermoplastic microspheres, based on total weight of the sheet structures.

Foamed copolyester thermoplastic sheet structures are made by combining the copolyester resin and gas-encapsulating thermoplastic microspheres, e.g. in an extruder hopper, forming a molten composition, and then extruding the molten composition through a die into a foamed sheet structure. Typical sheet thickness is 8-14 mm.

Optionally, additional ingredients may be added to the extruder including, but not limited to lubricants, UV light stabilizers, antistatic agents, coloring agents, fillers and reinforcing agents, flame retardants, impact modifiers, viscosity modifiers, nucleating agents, chemical foaming agents and other processing aids known in the polymer compounding art.

In a discontinuous process of the invention (i.e. when the foamed sheet structure is allowed to cool after being extruded, prior to being pre-compressed), extruded foamed sheet is annealed at a temperature of at least 70° C. (preferably between 70° and 90° C.) for a period of 10 to 60 minutes while no stress is applied to the sheet. A cool sheet may be heated in an oven in order to anneal it.

In a continuous process of the invention i.e. when a hot sheet exiting the extruder is to be pre-compressed prior to cooling), the hot (at a temperature of least 70° C., preferably 70°-90° C.) annealed sheet exiting the extruder is fed directly (i.e. within 3 to 120 seconds, preferably 3 to 10 seconds, after exiting the die) to compression rolls.

The annealed sheet that results from either the discontinuous or continuous process is pre-compressed at a temperature of at least 70° C. (preferably between 70° and 90° C.). Pre-compression may be accomplished, for example, by use of compression rolls or by compressing the sheet between platens. During this process, the thickness of the sheet is reduced to 20 to 50% of its original, uncompressed thickness. The compression is then released and the preceding cycle is repeated at least once, preferably twice, more preferably thrice and most preferably four times.

The resulting foamed, annealed and pre-compressed sheet structure is allowed to cool to room temperature (i.e. less than 30° C.). The compression set resistance, measured according to ISO 1856, 22 hours, 70° C., 30% compression of such sheet structures prepared by the process of the invention is less than 11%.

The resulting heat treated foamed copolyester thermoplastic elastomer sheets may be formed into articles that have many end use applications, including as vibrational dampers such as in a railroad track fastening system.

EXAMPLES

The Examples below provide greater detail for the compositions, uses and processes described herein.

Test Methods

Compression set: ISO 1856 at 70° C., 30% compression for 22 hours. The average of three samples is reported in the examples.

Example 1

Foamed sheet (approximately 10 mm thick) employed in the examples was prepared by combining HYTREL® 3078 polyetherester elastomer with 2 wt % Hytrel® 40CB carbon black masterbatch and 2.4 wt % of EXPANCEL® 930MB120 and extruding the resulting polymer blend. Samples for compression set testing were 40 mm diameter disks cut from the foamed sheets.

Sixteen extrusions of the polymer blend were performed in order to determine the optimum annealing temperature, annealing time, pre-compression amount and number of pre-compression cycles in order to minimize the compression set of the sample disks. Conditions used and the resulting compression set values are shown in Table I. Runs 7 and 10 exemplify the process of this invention and produced foamed disks having compression sets less than 11%.

TABLE I

| Run # | Annealing Temp., °C. | Annealing Time, minutes | % of Original Sheet Thickness During Pre-compression | # of Pre-compression Cycles | Compression Set |
|---|---|---|---|---|---|
| 1 | 23 | 10 | 65 | 3 | 17.1 |
| 2 | 23 | 65 | 100 | 5 | 17.8 |
| 3 | 23 | 65 | 30 | 1 | 17.6 |
| 4 | 23 | 120 | 100 | 1 | 18.3 |
| 5 | 23 | 120 | 30 | 3 | 17.9 |
| 6 | 70 | 10 | 65 | 1 | 14.2 |
| 7 | 70 | 10 | 30 | 3 | 10.7 |
| 8 | 70 | 65 | 100 | 3 | 16.2 |
| 9 | 70 | 65 | 65 | 3 | 12.2 |
| 10 | 70 | 65 | 30 | 5 | 10.5 |
| 11 | 70 | 120 | 65 | 1 | 12.5 |
| 12 | 120 | 10 | 100 | 5 | 15.7 |
| 13 | 120 | 65 | 100 | 1 | 15.3 |
| 14 | 120 | 65 | 65 | 3 | 14.8 |
| 15 | 120 | 120 | 100 | 5 | 15.5 |
| 16 | 120 | 120 | 30 | 3 | 14.8 |

What is claimed is:

1. A process for enhancing the compression set resistance of a foamed copolyester thermoplastic elastomer sheet structure comprising:
   A) providing a foamed copolyester thermoplastic sheet structure comprising gas-encapsulating thermoplastic microspheres;
   B) annealing said foamed copolyester thermoplastic sheet structure at a temperature of at least 70° C. for a period of 10 to 60 minutes to form an annealed foamed copolyester thermoplastic sheet structure having an uncompressed thickness;
   C) compressing, at a temperature of at least 70° C., said annealed foamed copolyester thermoplastic sheet structure to a thickness of 20 to 50% of the uncompressed thickness of said sheet structure;
   D) releasing said compression;
   E) repeating steps C) and D) at least once; and
   F) cooling said sheet structure to less than 30° C. to form a foamed copolyester sheet structure having a compression set resistance, as determined according to ISO 1856, 22 hours, 70° C., 30% compression of less than 11%.

2. A process of claim 1 wherein said annealing and compression steps are performed at a temperature between 70° and 90° C.

3. A process of claim 1 wherein said uncompressed thickness of said sheet structure is 8-14 mm.

4. A process of claim 1 wherein steps C) and D) are repeated at least twice.

5. A process of claim 1 wherein said copolyester is a copolyetherester elastomer.

6. A process for enhancing the compression set resistance of a foamed copolyester thermoplastic elastomer sheet structure comprising:
   A) extruding through a die a foamed copolyester thermoplastic sheet structure comprising gas-encapsulating thermoplastic microspheres;
   B) maintaining said foamed copolyester thermoplastic sheet structure exiting said die at a temperature of at least 70° C. for a period of 3 to 120 seconds to form an annealed foamed copolyester thermoplastic sheet structure having an uncompressed thickness;
   C) compressing, at a temperature of at least 70° C., said annealed foamed copolyester thermoplastic sheet structure to a thickness of 20 to 50% of the uncompressed thickness of said sheet structure;
   D) releasing said compression;
   E) repeating steps C) and D) at least once; and
   F) cooling said sheet structure to less than 30° C. to form a foamed copolyester sheet structure having a compression set resistance, as determined according to ISO 1856, 22 hours, 70° C., 30% compression of less than 11%.

7. A process of claim 6 wherein said annealing and compression steps are performed at a temperature between 70° and 90° C.

8. A process of claim 6 wherein said uncompressed thickness of said sheet structure is 8-14 mm.

9. A process of claim 6 wherein steps C) and D) are repeated at least twice.

10. A process of claim 6 wherein said copolyester is a copolyetherester elastomer.

* * * * *